(12) United States Patent
Choudhary et al.

(10) Patent No.: US 7,160,344 B2
(45) Date of Patent: Jan. 9, 2007

(54) PROCESS FOR THE CONTINUOUS PRODUCTION OF CARBON MONOXIDE-FREE HYDROGEN FROM METHANE OR METHANE-RICH HYDROCARBONS

(75) Inventors: Vasant Ramchandra Choudhary, Pune (IN); Amarjeet Munshiram Rajput, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 571 days.

(21) Appl. No.: 10/322,970

(22) Filed: Dec. 18, 2002

(65) Prior Publication Data

US 2004/0118047 A1 Jun. 24, 2004

(51) Int. Cl.
  *C01B 3/32* (2006.01)

(52) U.S. Cl. .................. 48/198.7; 48/197 R; 48/198.1; 48/127.3; 423/652; 423/653; 423/654; 252/373

(58) Field of Classification Search ............... 48/127.9, 48/61, 197 R; 423/652–654; 252/373
See application file for complete search history.

(56) References Cited

U.S. PATENT DOCUMENTS 6,509,000 B1 * 1/2003 Choudhary et al. ......... 423/652

* cited by examiner

*Primary Examiner*—Glenn Caldarola
*Assistant Examiner*—Vinit H. Patel
(74) *Attorney, Agent, or Firm*—Renner, Otto, Boisselle & Sklar, LLP

(57) ABSTRACT

The present invention relates to a catalytic process for the continuous production of carbon monoxide-free hydrogen from methane or methane-rich hydrocarbons using a solid catalyst comprising at least one group VIII metal in two parallel catalytic reactors.

20 Claims, 1 Drawing Sheet

PROCESS FOR THE CONTINUOUS PRODUCTION OF CARBON MONOXIDE-FREE HYDROGEN FROM METHANE OR METHANE-RICH HYDROCARBONS

FIELD OF THE INVENTION

This invention relates to a process for the continuous production of carbon monoxide-free hydrogen from methane or methane-rich hydrocarbons using at least one group VIII metal containing solid catalyst in two parallel reactors. This invention particularly relates to a process for the continuous production of carbon monoxide-free hydrogen from methane or methane-rich hydrocarbons using at least one group VIII metal containing solid catalyst in two parallel reactors operated in a cyclic manner for two different reactions: (1) the decomposition of methane or methane-rich hydrocarbons to hydrogen and carbon, which is deposited on the catalyst; and (2) the gasification of the carbon deposited on the catalyst by steam in the presence or absence of oxygen, carried out simultaneously in the two reactors, and collecting the product stream of each of the two reactions separately.

The process of this invention could be used in the petroleum refining and chemical industries for the production of carbon monoxide-free hydrogen required for proton exchange membrane fuel cells and also for the various hydro-treating processes in the petroleum refining and hydrogenation processes in chemical industries.

BACKGROUND OF THE INVENTION

The demand for hydrogen has been increasing day-by-day for the hydro-treating processes in petroleum industries and also for hydrogen fuel cells, both stationary and non-stationary fuel cells. Since hydrogen is a non-polluting fuel, its use as a fuel, particularly for fuel cells, has been increasing very fast. However, the well-established proton exchanged membrane fuel cells require carbon monoxide-free hydrogen as a fuel to avoid deactivation of the noble metal catalyst in the fuel cells.

The main natural sources of hydrogen are hydrocarbons and water. Among the hydrocarbons, methane has the highest hydrogen to carbon ratio and hence it is the most preferred choice among the hydrocarbons for hydrogen production.

The conventional processes for the production of hydrogen are based on steam reforming of hydrocarbons, such as naphtha and methane or natural gas, and auto thermal reforming of hydrocarbons, particularly heavier hydrocarbons. The hydrogen production processes have been recently reviewed by Fierro and coworkers [reference: Pena, M. A.; Gomez, J. P. and Fierro, J. L. G.; *Applied Catalysis A: General*; Volume 144, pages 7 to 57, year 1996].

Both the hydrocarbon steam reforming and auto thermal reforming processes are operated at high temperatures, above about 900° C., and the product stream of these processes contains appreciable amounts of carbon monoxide along with hydrogen. The removal of carbon monoxide at low concentrations from hydrogen is very costly. Hence, the hydrocarbon steam reforming and auto thermal reforming processes are not economical for the production of carbon monoxide-free hydrogen. Thus, there is a practical need to develop a process for the production of hydrogen from methane as methane has the highest hydrogen to carbon ratio among the hydrocarbons at temperatures lower than that used in the conventional hydrocarbon steam reforming and auto thermal reforming processes.

Production of Carbon Monoxide-Free Hydrogen From Methane:

A few processes are known also for the production of carbon monoxide-free hydrogen from methane.

Recently, Kikuchi [reference: Kikuchi, E.; *Hydrogen-permselective membrane reactors*, CATTECH, March 1997, pages 67 to 74, Baltzer Science Publishers] has described a process based on steam reforming of methane in a membrane reactor to produce hydrogen free of carbon monoxide. By applying a Pd/ceramic composite membrane to steam reforming of methane over a commercial supported nickel catalyst, methane conversion up to 100 percent can be accomplished in a Pd-membrane reactor at temperatures as low as 500° C. to produce carbon monoxide-free hydrogen. In this process, the hydrogen produced in the steam reforming of methane is continuously removed from the reaction system by the selective permeation of hydrogen through the Pd-membrane. However this process has not yet been commercialized and it has the following drawbacks/limitations: (1) because of the use of a number of Pd-membrane tubes, the capital cost of this process is very high; (2) there is a possibility that the Pd-membrane becomes deactivated by deposition of carbonaceous matter; and (3) there is also a problem of membrane stability and/or a possibility of membrane failure due to formation of pinholes in the membrane.

A Japanese patent [JP 09234372 A2, Sep. 09, 1997] discloses a process for the manufacture of hydrogen by thermal decomposition of hydrocarbons at 200° C. to 1000° C. using a catalyst containing nickel, alkali or alkaline earth compounds. A Russian patent [RU 2071932 C1, Jan. 20, 1997] discloses the production of hydrogen and carbon by thermal decomposition of methane on nickel catalyst.

A recent Japanese patent [JP 11228102 A2, Aug. 24, 1999] discloses reactors for thermal decomposition of methane to form carbon and hydrogen. Hydrogen production by catalytic cracking of methane or natural gas and other hydrocarbons, at below 900° C. using nickel-based catalyst, is disclosed in a few publications [reference: Zhang, T. and Amiridis, M. D., *Applied Catalysis A: General*, Volume 167, pages 161 to 172, year 1998; Muradov, N. Z., *Energy Fuels*, Volume 12, pages 41 to 48, year 1998; Kuvshinov, G. G. et. al.; *Hydrogen Energy Progress XI Proceedings of World Hydrogen Energy Conference*, 11$^{th}$, Volume 1, pages 655 to 660, Edited by Veziroglu, T., year 1996; and Muradov, N. Z., *Proceedings of US DOE Hydrogen Program Review*, Volume 1, pages 513 to 535, year 1996].

In the above prior art processes, based on catalytic cracking or thermo-catalytic decomposition of methane or other hydrocarbons, the hydrogen produced is free from carbon monoxide and carbon dioxide, but the catalyst deactivation is fast due to the carbon formed on the catalyst and this is accompanied with a fast increase in the pressure drop across the catalyst bed, making the process unpractical for the hydrogen production.

Recently, Choudhary and Goodman reported a process for the production of carbon monoxide-free hydrogen involving stepwise methane steam reforming [reference: Choudhary, T. V. and Goodman, D. W., *Catalysis Letter*, Volume 59, pages 93 to 94, year 1999]. In this process, methane pulse and water pulses are passed over a pre-reduced nickel-based catalyst at 375° C., alternatively. When the methane pulse is passed over the catalyst, the methane from the pulse is decomposed to hydrogen and carbon, leaving the carbon deposited on the catalyst according to the reaction:

$$CH_4 \rightarrow C + 2H_2 \uparrow \quad (1)$$

When the water pulse is passed over the catalyst with the carbon deposited on it, the carbon on the catalyst reacts with steam to form $CO_2$ and hydrogen according to the reaction:

$$C + 2H_2O \rightarrow CO_2 + 2H_2 \quad (2)$$

In some cases, the products of the above reaction are also accompanied by an amount of unreacted methane.

In this process, although the carbon monoxide-free hydrogen is produced by catalytic cracking of methane and the carbon deposited on the catalyst is removed by the cyclic operation of the methane and water pulses in the same reactor, the process is not operated in the steady state and the hydrogen produced is not continuous. Hence, it is not practical and also not economical to produce carbon monoxide-free hydrogen on a large scale by this transient process involving cyclic operation of methane and water pulses.

Very recently, Choudhary et al. have reported a possibility of the continuous production of hydrogen at 500° C. by carrying out the above two reactions, Reactions 1 and 2, simultaneously, in two parallel catalytic reactors in a cyclic manner by switching a methane containing feed, 18.2 mole percent $CH_4$ in $N_2$, and a steam containing feed, 20.5 percent steam in $N_2$, between the two reactors at predecided intervals of time, and combining the product streams of the two reactors [reference: V. R. Choudhary, S. Banerjee and A. M Rajput, *Journal of Catalysis*, Volume 198, page 136, year 2001]. However, both the reactions, Reactions 1 and 2, are thermodynamically favored at higher temperatures. The methane decomposition, Reaction 1, is also favored at lower pressure or lower concentration of methane. Our preliminary studies show that both the methane conversion in Reaction 1 and the degree of carbon gasification in Reaction 2 are decreased sharply with increasing the methane concentration and for decreasing the temperature. Hence, using undiluted or less diluted methane, as a feed, permits the very high cost of separation of the diluent to be reduced. For obtaining high conversion of methane, Reactions 1 and 2 need to be carried out at a higher temperature, above about 600° C. However, at such a high temperature, a significant amount of carbon monoxide is formed in Reaction 2 and therefore carbon monoxide-free hydrogen cannot be obtained by the above cyclic process.

Because of the above-mentioned drawbacks and limitations of all the prior art processes, there is a great need for developing a process for the continuous production of carbon monoxide-free hydrogen by catalytic decomposition of methane or natural gas at a temperature below about 900° C., while avoiding the carbon build-up on the catalyst by its time-to-time removal by some means.

OBJECT OF THE INVENTION

Accordingly, one object of this invention is to provide a process for the continuous production of carbon monoxide-free hydrogen from methane or methane-rich hydrocarbons at a temperature above about 600° C., but below about 900° C., involving catalytic decomposition of methane to hydrogen and carbon, which is deposited on the catalyst used, and removal of the carbon by its gasification by steam, with or without oxygen, while avoiding carbon build-up on the catalyst and thereby avoiding the catalyst deactivation and increase in a pressure drop across the catalyst bed during the process.

SUMMARY OF THE INVENTION

Accordingly, an object of the invention is accomplished by providing a process for the continuous production of carbon monoxide-free hydrogen by operating the process in two parallel reactors, both containing a solid catalyst comprising at least one group VIII metal and having different feeds so that the methane decomposition reaction and the carbon gasification reaction, involving the formation of CO, $CO_2$ and $H_2$, are carried out simultaneously in a cyclic manner in the two parallel reactors by regularly switching between them at an interval of time at two different feed streams—one comprising methane and a second comprising steam, with or without oxygen. Thereby, a continuous production of carbon monoxide-free hydrogen is effected from the methane decomposition reaction, the products of which are collected using the product stream switching valve, while collecting separately the products of the carbon reforming or gasification reaction and flushing them from the reactor by pure hydrogen or by the products of methane decomposition, before switching simultaneously both the feed and product switching valve, without the catalyst deactivation and development of high pressure drop across the catalyst bed in both the reactors.

Another object of the invention is to produce carbon monoxide-free hydrogen as a product of the above-mentioned process.

To the accomplishment of the foregoing and related ends, the invention, then, comprises the features hereinafter fully described and particularly pointed out in the claims. These embodiments are indicative, however, of but a few of the various ways in which the principles of the invention may be employed. Other objects, advantages and features of the invention will become apparent from the following detailed description of the invention.

Figure 1:
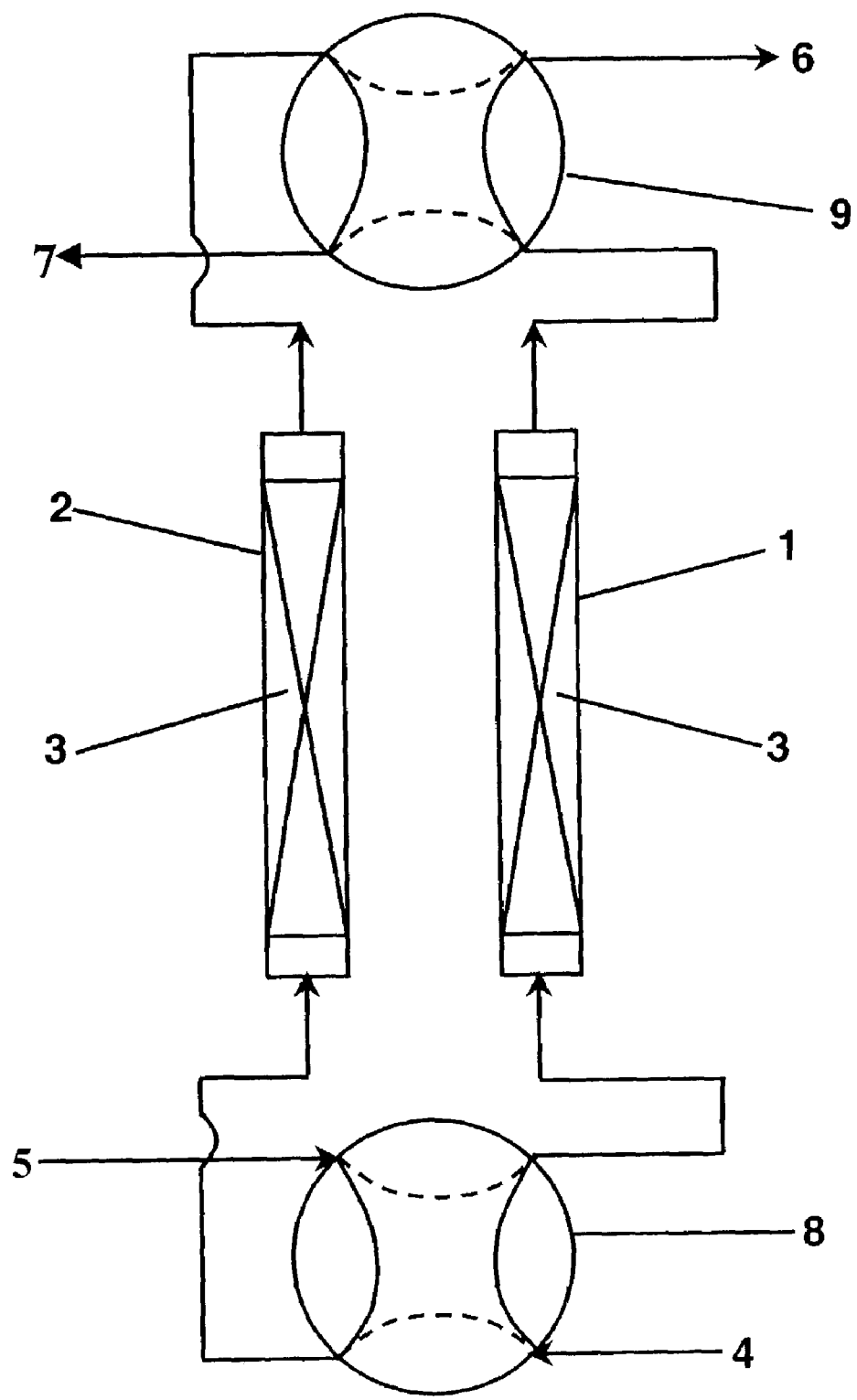
FIG. 1 shows a schematic flow sheet of the process of this invention. The description of labels 1 to 9 in the drawing are as follows.

1 is Reactor A;

2 is Reactor B;

3 is catalyst fixed bed or fluid bed;

4 is Feed A (which comprises methane or methane-rich hydrocarbons);

5 is Feed B1 (which comprises steam with or without oxygen gas) or Feed B2 (which is pure $H_2$ or product of Feed A);

6 is Product Gas A (CO-free $H_2$ with unconverted methane, obtained from Feed A);

7 is Product Gas B (CO, $CO_2$, $CH_4$ and $H_2$, with or without $O_2$, obtained from Feeds B1 and B2);

8 is Feed Stream Switch Over Valve; and 9 is Product Stream Switch Over Valve.

The methane decomposition and carbon gasification reactions occur in Reactor A and Reactor B, respectively. After switching the two valves simultaneously, the methane decomposition and carbon gasification reactions occur in Reactor B and Reactor A, respectively. The gaseous products of the two reactors are collected separately in the cyclic operation, as shown in FIG. 1.

DETAILED DESCRIPTION OF THE INVENTION

In accordance with one embodiment, the present invention relates to a process for the continuous production of carbon monoxide-free hydrogen from methane or methane-rich hydrocarbons, using a solid catalyst comprising at least one group VIII metal in two parallel catalytic reactors, said process comprising the steps of:

(i) packing the solid catalyst in the two different catalytic reactors kept parallel;

(ii) pre-treating the catalyst of step (i) kept in both the reactors with a reducing agent, such as pure $H_2$ or $H_2$—$N_2$ mixture containing at least about 5 mole percent $H_2$, at a temperature in the range of about 600° C. to about 800° C., and at a pressure of at least about 1 atmosphere for a period of at least about 0.5 hour;

(iii) contacting the pretreated catalyst of step (ii) with a first gaseous feed comprising methane or natural gas, called Feed A, with the solid catalyst of the first reactor, called Reactor A, at a temperature in the range of about 600° C. to about 1000° C., and at a pressure of at least about 1 atmosphere;

(iv) contacting simultaneously a second gaseous feed comprising steam, with or without oxygen, called Feed B1, with the solid catalyst in the second reactor, called Reactor B, which is similar to Reactor A, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from the other feed(s), called Product Gas B, using product switch over valve situated between the two parallel reactors, Reactor A and Reactor B, at an interval time in the range of about 0.1 minutes to about 100 minutes, such that, before the simultaneous switching of the two switch over valves for the next cyclic operation, Feed B1 is replaced by pure $H_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free $H_2$ and unconverted methane, obtained from Feed A, and the second consisting of CO, $CO_2$, $CH_4$ and $H_2$, with or without $O_2$, obtained from Feeds B1 and B2, after the removal of water by condensation; and (v) separating the carbon monoxide-free hydrogen from Product Gas A and the hydrogen, methane and carbon monoxide from Product Gas B.

In another embodiment, the present invention provides a process, wherein in step (ii), the reducing agent gas is provided at a gas hourly space velocity in the range of about 500 cm³/(g·h) to about 20,000 cm³/(g·h).

In another embodiment, the present invention provides a process, wherein in step (iii), the first gaseous feed is provided at a gas hourly space velocity in the range of about 250 cm³/(g·h) to about 50,000 cm³/(g·h).

In another embodiment, the present invention provides a process, wherein in step (iv), the second gaseous feed is provided at a gas hourly space velocity in the range of about 250 cm³/(g·h) to about 50,000 cm³/(g·h).

In another embodiment, the present invention provides carbon monoxide-free hydrogen produced from methane or methane-rich hydrocarbons, the carbon monoxide-free hydrogen being produced by a process which uses a solid catalyst comprising at least one group VIII metal in two parallel catalytic reactors, the process comprising the steps of:

(i) packing the solid catalyst in the two different catalytic reactors kept parallel;

(ii) pre-treating the catalyst of step (i) kept in both the reactors with a reducing agent, such as pure $H_2$ or $H_2$—$N_2$ mixture containing at least about 5 mole percent $H_2$, at a temperature in the range of about 600° C. to about 800° C., and at a pressure of at least about 1 atmosphere for a period of at least about 0.5 hour;

(iii) contacting the pretreated catalyst of step (ii) with a first gaseous feed comprising methane or natural gas, called Feed A, with the solid catalyst of the first reactor, called Reactor A, at a temperature in the range of about 600° C. to about 1000° C., and at a pressure of at least about 1 atmosphere;

(iv) contacting simultaneously a second gaseous feed comprising steam, with or without oxygen, called Feed B1, with the solid catalyst in the second reactor, called Reactor B, which is similar to Reactor A, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from the other feed(s), called Product Gas B, using product switch over valve situated between the two parallel reactors, Reactor A and Reactor B, at an interval time in the range of about 0.1 minutes to about 100 minutes, such that, before the simultaneous switching of the two switch over valves for the next cyclic operation, Feed B1 is replaced by pure $H_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free $H_2$ and unconverted methane, obtained from Feed A, and the second consisting of CO, $CO_2$, $CH_4$ and $H_2$, with or without $O_2$, obtained from Feeds B1 and B2 after the removal of water by condensation; and (v) separating the carbon monoxide-free hydrogen from Product Gas A and the hydrogen, methane and carbon monoxide from Product Gas B.

In another embodiment, the carbon monoxide-free hydrogen produced in accordance with the above-mentioned process uses a solid catalyst in step (i), the solid catalyst being at least one group VIII metal selected from Fe, Co, Ni, Ru, Rh, Pd, Pt, Ir, Os or mixtures thereof.

In accordance with one embodiment, the present invention relates to a process for the continuous production of carbon monoxide-free hydrogen from methane or methane-rich hydrocarbons, using a solid catalyst comprising at least one group VIII metal in two parallel catalytic reactors, said process comprising the steps of:

(i) packing the solid catalyst in the two different catalytic reactors kept parallel;

(ii) pretreating the catalyst of step (i) in both the reactors with a reducing agent, such as pure $H_2$ or $H_2$—$N_2$ mixture containing at least about 5 mole percent $H_2$, at a gas hourly space velocity in the range of about 500 cm³/(g·h) to about 20,000 cm³/(g·h) at a temperature in the range of about 600° C. to about 800° C., and at a pressure of at least about 1 atmosphere for a period of at least about 0.5 hour;

(iii) contacting the pretreated catalyst of step (ii) with a first gaseous feed comprising methane or natural gas, called Feed A, at a gas hourly space velocity in the range of about 250 cm$^3$/(g·h) to about 50,000 cm$^3$/(g·h) with the solid catalyst of a first reactor, called Reactor A, at a temperature in the range of about 600° C. to about 1000° C., and at a pressure of at least about 1 atmosphere;

(iv) contacting simultaneously a second gaseous feed comprising steam, with or without oxygen, called Feed B1, at a gas hourly space velocity in the range of about 250 cm$^3$/(g·h) to about 50,000 cm$^3$/(g·h) with the solid catalyst in the second reactor, called Reactor B, which is similar to Reactor A, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from the other feed(s), called Product Gas B, using product switch over valve situated between the two parallel reactors, Reactor A and Reactor B, at an interval time, in the range of about 0.1 minutes to about 100 minutes, such that before the simultaneous switching of the two switch over valves for the next cyclic operation, Feed B1 is replaced by pure H$_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free H$_2$ and unconverted methane, obtained from Feed A, and the second consisting of CO, CO$_2$, CH$_4$ and H$_2$, with or without O$_2$, obtained from Feeds B1 and B2, after the removal of water by condensation; and (v) separating the carbon monoxide-free hydrogen from Product Gas A and the hydrogen, methane and carbon monoxide from Product Gas B.

In another embodiment, the present invention provides a process wherein the gas hourly space velocity of Feed A is preferably in the range of about 500 cm$^3$/(g·h) to about 25,000 cm$^3$/(g·h).

In another embodiment, the present invention provides a process wherein the temperature maintained in the two reactors, Reactor A and Reactor B, is in the range of about 600° C. to about 800° C.

In another embodiment, the present invention provides a process wherein the gas hourly space velocity of Feed B1 is in the range of about 500 cm$^3$/(g·h) to about 25,000 cm$^3$/(g·h).

In another embodiment, the present invention provides a process wherein the oxygen to steam ratio in Feed B1 is in the range of from 0:1 to about 0.5:1.0.

In another embodiment, the present invention provides a process wherein the interval times for the feed stream and product stream switch over ranges preferably from about 1 minute to about 30 minutes.

In another embodiment, the present invention provides a process wherein the concentration of methane used in Feed A is at least about 80 percent.

In another embodiment, the present invention provides a process wherein the concentration of steam used in Feed B1 is in the range of about 50 mole percent to 100 mole percent.

In another embodiment, the present invention provides a process wherein the concentration oxygen in the Feed B1 ranges from about 0 mole percent to about 50 mole percent.

In another embodiment, the present invention provides a process wherein the two parallel reactors used are either fixed-bed reactors or packed bed reactors.

In another embodiment, the present invention provides a process wherein the solid catalyst used in step (i), is at least one group VIII metal selected from Fe, Co, Ni, Ru, Rh, Pd, Pt, Ir, Os or mixtures thereof.

In another embodiment, the present invention provides a process wherein the at least one group VIII metal in the solid catalyst is selected from nickel, cobalt or mixtures thereof.

In another embodiment, the present invention provides a process wherein the concentration of steam in the Feed B1 ranges from about 50 mole percent to about 500 mole percent.

In another embodiment, the present invention provides a process wherein the preferred concentration of steam in the feed B1 ranges from about 50 mole percent to about 100 mole percent.

The process of this invention will be more fully understood by reference to the attached drawing to which reference is made in the examples.

In the process of this invention, the two parallel reactors may be two parallel fluid bed reactors or two parallel fixed-bed reactors; the preferred two parallel reactors are fixed-bed reactors. The two different feed streams, Feed A and Feed B1, and also the two different product streams, Product Gas A (products of Feed A) and Product Gas B (products of Feeds B1 and B2), can be switched between the two reactors simultaneously using the two feed and product switch over valves operated manually or automatically, as shown in FIG. 1. The group VIII metals are Fe, Co, Ni, Ru, Rh, Pd, Pt, Ir, Os and mixtures thereof.

The main product of the process of this invention is carbon monoxide-free hydrogen, which is formed in the methane decomposition reaction. The side products are a mixture of carbon dioxide, carbon monoxide and hydrogen, which are formed in the reforming or gasification by steam and/or oxygen of the carbon deposited on the catalyst. At a particular time, the main reactions occurring in the two parallel reactors are as follows. In the Reactor A, through which the feed comprising methane (Feed A) is passed, the catalytic decomposition of methane occurs producing 2 moles of hydrogen and 1 mole of carbon, which is deposited on the catalyst, per mole of methane reacted. At the same time, in the second reactor through which the feed comprising steam with or without oxygen, Feed B1, is passed, the steam and/or oxygen react with the carbon deposited on the catalyst to produce carbon monoxide, carbon dioxide and hydrogen. These two different reactions occur in a cyclic manner when the two feeds and two product lines are simultaneously switched between the two reactors at an interval of time and the gaseous products of the two reactions are collected separately.

In step (ii) of the process of this invention, the preferred gas hourly space velocity of Feed A ranges from about 500 cm$^3$/(g·h) to about 25,000 cm$^3$/(g·h), the preferred temperature in each of the two reactors, Reactor A and Reactor B, ranges from about 600° C. to about 800° C., the preferred gas hourly space velocity of Feed B1 ranges from about 500 cm$^3$/(g·h) to about 25,000 cm$^3$/(g·h), the preferred oxygen to steam ratio in Feed B1 ranges from 0 to about 1, the preferred interval of time of the feed stream and product stream switch over ranges from about 1 minute to about 30 minutes, the preferred concentration of methane in the Feed A is above about 80 mole percent, the preferred concentration of steam in the Feed B2 ranges from about 50 mole percent to about 100 mole percent, the preferred concentration of oxygen in the Feed B1 ranges from 0 mole percent to about 50 mole percent, and the preferred group VIII metal(s) in the solid catalyst is nickel, cobalt or a mixture thereof.

In the process of this invention, the two parallel reactors, Reactor A and Reactor B, are preferably fixed-bed reactors. The preferred solid catalyst used in the process of this invention may be selected from nickel, with or without cobalt, deposited on various micro or meso porous metal oxides, such as alumina, silica-alumina, silica, zerconia, yettria, ceria, magnesia and the like, zeolites or zeolite-like materials, such as HY, Ce—Na—Y, HM, Hβ, H-ZSM-5, MCM-41 and the like. The nickel and/or cobalt present in the catalyst are in their reduced form or in their zero oxidation state.

The solid catalyst comprising at least one group VIII metal used in the process of this invention can be prepared by the co-precipitation or impregnation catalyst preparation techniques known in the prior art.

The role of step (i) of the process of this invention is to reduce the transition metal oxide present, at least on the surface of the catalyst, for example, nickel oxide, cobalt oxide, iron oxide, etc., present in the catalyst are reduced to the corresponding metal. This step is an important one. The reduction of group VIII metal oxide present on the catalyst surface to its metallic form is advantageous to the catalytic activity of the process of this invention.

In step (ii) of the process of this invention, the methane or methane-rich hydrocarbons, and steam, with or without oxygen, are reactants which are converted at least partly in the process. The role of steam is to react with the carbon, which is formed in the decomposition of methane on the reduced catalyst, producing carbon monoxide, carbon dioxide and hydrogen, and thereby removing the carbon deposited on the catalyst. The role of the oxygen is to activate the carbon, which is otherwise difficult to gasify by steam alone. The oxygen is consumed at least partly by its reaction with the carbon to form CO and $CO_2$. The role of the solid catalyst is to catalyze the methane decomposition reaction and the carbon gasification by steam and/or oxygen.

In the process of this invention, two different products obtained from the two different feeds, Feed A and Feed B1, are collected separately. The product stream obtained from Feed A contains only hydrogen and unconverted methane; it is free from carbon monoxide. The unconverted methane is separated from hydrogen by the pressure swing adsorption-separation processes known in the prior art, and thereby, carbon monoxide-free hydrogen is produced by the process of this invention. The product stream obtained from Feed B1 contains the carbon gasification products CO, $CO_2$, $H_2$, methane and unconverted steam and/or oxygen, which may be separated by processes known in the prior art.

In the process of this invention, the flushing of Feed B1 and the products of its reaction from the reactor by pure $H_2$ or by the products of Feed A, before switching simultaneously the two switch over valves, as shown in FIG. 1, is essential to avoid contamination of the products of Feed A by the products of Feed B1 in the next cycle.

The present invention is described with respect to the following examples illustrating the process of this invention for the production of carbon monoxide-free hydrogen from methane or methane-rich hydrocarbons and steam, with or without oxygen, over different solid catalysts comprising nickel, with or without cobalt, at different process conditions. These examples are provided for illustrative purposes only and are not intended to be construed as limitations on the process of this invention.

EXAMPLES

Definitions of the Terms used in the Examples

GHSV=Gas hourly space velocity, defined as the volume of a gaseous feed, measured at 0° C. and 1 atmosphere, passed over unit mass of catalyst per unit time.

Percent methane conversion is defined as the mole percent of methane present in the feed converted into products other than methane. It is estimated as follows:

Methane conversion (%)=[(moles of methane in feed—moles of methane in products)/(moles of methane in feed)]×100

Hydrogen productivity in the process is expressed as the amount of hydrogen in mmoles produced per hour per gram of the catalyst used in the process.

Examples 1 to 8

These examples illustrate the process of this invention for the continuous production of carbon monoxide-free hydrogen from methane, using Ni—$ZrO_2$ (Ni/Zr mole ratio=1.0) catalyst at different process conditions.

The Ni/$ZrO_2$ catalyst was obtained by reducing NiO/$ZrO_2$ by hydrogen at 600° C. for 6 hours. The NiO—$ZrO_2$ catalyst was prepared by co-precipitating mixed hydroxides of nickel and zirconium from a 650 $cm^3$ aqueous solution containing 58.78 g $Ni(NO_3)_2$. $6H_2O$ and 46.76 g $ZrO(NO_3)_2.xH_2O$ using an aqueous solution of NaOH at a pH of 9.0 at room temperature, filtering and thoroughly washing the precipitate with deionized water, drying the washed precipitate at 105° C. for 18 hours, pressing and crushing to particles of 0.3 to 0.4 mm size and calcining in air at 600° C. for 2 hours. The surface area of the NiO/$ZrO_2$ catalyst was 63 $m^2/g$.

The process of this invention using the Ni/$ZrO_2$ catalyst was carried out in two parallel stainless steel fixed bed reactors, as shown schematically in FIG. 1. Each reactor was packed with 0.4 grams of catalyst particles of size 0.3 to 0.6 mm and was kept in a tubular furnace. The two parallel reactors had two different feeds connected through a four-way flow switch valve and also had two different product lines connected through a four-way flow switch valve, as shown in FIG. 1. Both the flow switch valves were operated simultaneously at an interval of time. The temperature in both the reactors was measured by a Chromel-Alumel thermocouple located at the center of the catalyst bed in both the reactors. Before carrying out the catalytic reaction, the catalyst in both the reactors was reduced by pre-treating it with a $H_2$—$N_2$ mixture at the conditions given in Table 1. After the reduction of the catalyst in both the reactors, Feed A, comprising methane, was passed over the reduced catalyst in Reactor A and simultaneously Feed B2, containing steam, with or without oxygen, was passed over the reduced catalyst in Reactor B, and before switching the two valves for the next cyclic operation, Feed B1 was replaced by pure $H_2$ and the reactor and feed and product lines are flushed by $H_2$ of a volume at least one time the volume of the reactor and feed and product lines between the two switch valves. The cyclic process operation was accomplished by switching Feed A and Feed B1 between the two reactors regularly at an interval of time and replacing Feed B1 by pure $H_2$, as described above, before switching simultaneously the two switch valves, at the process conditions given in Table 1.

The gaseous products obtained from the two different feeds were collected separately in two gas collectors after condensing and removing the water from them by condensation. The collected two different gaseous products were analyzed by gas chromatograph, using a spherocarb column and thermal conductivity detector. For the gas chromatographic analysis of hydrogen in the products, high purity nitrogen was used as a carrier gas. Whereas, for the gas chromatographic analysis of the methane, carbon dioxide and carbon monoxide present in the products, helium was used as a carrier gas. The results obtained at the different process conditions are presented in Table 1.

The results in Example 7 clearly show that when the cyclic process is operated at a lower temperature, 501° C., than at least about 600° C. used in the process of this invention, the conversion of methane and the productivity of CO-free $H_2$ are very poor.

Examples 9 to 11

These examples also illustrate the process of the present invention for the production of carbon monoxide-free hydrogen from methane and steam, with or without $O_2$, using the following solid catalysts: Ni/Si-MCM-41, Ni/Ce—NaY and Co—Ni/MgO/SA5205.

The Ni/Si-MCM-41 (12 weight percent Ni) was prepared by impregnating 5.0 grams of particles (0.3 to 0.4 mm of size) of high silica MCM-41 [prepared by the procedure given in the reference: Choudhary, V. R. and Sansare, S. D., Proc. Indian Acad. Sci. (Chem. Sci.), Volume 109, number 4, pages 229 to 233, August 1997] with 3.4 grams of $Ni(NO_3)_2.6H_2O$ from its aqueous solution by the incipient wetness technique, followed by drying at 105° C. for 12 hours, and calcining at 500° C. for 2 hours, and by reducing the catalyst by hydrogen at 500° C. for 4 hours.

The NiO/Ce—NaY (10 weight percent Ni, 72 percent Ce-exchanged NaY) was prepared by impregnating 5.0 grams of particles (0.3 to 0.4 mm of size) of 72 percent Ce-exchanged NaY (prepared by the procedure given in the reference: Choudhary, V. R., Srinivasan, K. R. and Akolekar, D. B., Zeolites, Volume 9, pages 115 to 119, year 1989) with 2.75 grams of $Ni(NO_3)_2.6H_2O$ from its aqueous solution by the incipient wetness technique, followed by drying at 105° C. for 12 hours, and calcining at 500° C. for 2 hours, and then reducing the catalyst by $H_2$ at 600° C. for 12 hours.

The NiO—CoO/MgO/SA5205 with Co/Ni mole ratio of 0.2 and NiO—CoO and MgO loadings on SA 5205 support, which is macroporous low surface area sintered silica-alumina catalyst carrier obtained from Norton Company (USA), of 14.5 wt. % and 7.2 weight percent, respectively, was prepared by the procedure described by Choudhary et al. (Ref. V. R. Choudhary et al *AIChEJ Journal*, Volume 47, page 1632, year 2001). The catalyst was reduced by 20% $H_2$ in $N_2$ at 800° C. for 4 hours.

The process of this invention over each of the above catalysts was carried out in the two parallel reactors and following the procedure same as that described in the earlier examples (Examples 1 to 10), at the catalyst pretreatment and catalytic process conditions given in Table 2. The results, the methane conversion and the CO-free hydrogen produced in the process of this invention over the above mentioned catalysts, are included in Table 2.

TABLE 1

CO-FREE HYDROGEN PRODUCTION FROM THE PROCESS OF THE INVENTION USING THE Ni/ZrO$_2$ CATALYST AT DIFFERENT PROCESS CONDITIONS

| Example No. | Example 1 | Example 2 | Example 3 | Example 4 | Example 5 | Example 6 | Example 7 | Example 8 |
|---|---|---|---|---|---|---|---|---|
| Catalyst Pretreatment Conditions Employed in Step (i) | | | | | | | | |
| Pretreatment Gas | 10% $H_2$ in $N_2$ | 10% $H_2$ in $N_2$ | 10% $H_2$ in $N_2$ | 10% $H_2$ in $N_2$ | 10% $H_2$ in $N_2$ | 10% $H_2$ in $N_2$ | 10% $H_2$ in $N_2$ | 80% $H_2$ in $N_2$ |
| GHSV of Pretreatment Gas (cm$^3$/(g · h)) | 2500 | 3000 | 2000 | 2130 | 2240 | 2465 | 3010 | 1040 |
| Temperature of Pretreatment (° C.) | 615 | 640 | 620 | 705 | 690 | 660 | 501 | 801 |
| Period of the Pretreatment (hours) | 2.5 | 2.0 | 2.0 | 1.5 | 1.2 | 1.5 | 5.0 | 1.0 |
| Process Conditions in Step (ii) | | | | | | | | |
| Feed A | Pure Methane | Pure Methane | Pure Methane | Pure Methane | Pure Methane | Pure Methane | Pure Methane | 85% Methane |
| Feed B1 | Steam | Steam | Steam | Steam | 5% $O_2$ in Steam | 3% $O_2$ in Steam | Steam | 2% $O_2$ in Steam |
| Feed B2 | Pure $H_2$ | Pure $H_2$ | Pure $H_2$ | Pure $H_2$ | Pure $H_2$ | Pure $H_2$ | Pure $H_2$ | Pure $H_2$ |
| GHSV of Feed A (cm$^3$/(g · h)) | 8010 | 2420 | 5100 | 9030 | 3550 | 4530 | 4530 | 1960 |
| GHSV of Feed B1 (cm$^3$/(g · h)) | 7520 | 2510 | 5030 | 9000 | 3490 | 4490 | 4580 | 1950 |
| GHSV of Feed B2 (cm3/(g · h)) | 7035 | 2500 | 5070 | 9120 | 3510 | 4520 | 4490 | 1960 |
| Temperature of Reactor A (° C.) | 615 ± 3 | 635 ± 3 | 620 ± 3 | 710 ± 4 | 695 ± 3 | 665 ± 3 | 502 ± 3 | 799 ± 5 |
| Temperature of Reactor B (° C.) | 615 ± 3 | 635 ± 3 | 620 ± 3 | 710 ± 4 | 695 ± 3 | 665 ± 3 | 501 ± 3 | 799 ± 5 |

TABLE 1-continued

CO-FREE HYDROGEN PRODUCTION FROM THE PROCESS
OF THE INVENTION USING THE Ni/ZrO$_2$ CATALYST
AT DIFFERENT PROCESS CONDITIONS

| Example No. | Example 1 | Example 2 | Example 3 | Example 4 | Example 5 | Example 6 | Example 7 | Example 8 |
|---|---|---|---|---|---|---|---|---|
| Pressure in Reactor A (atm) | 1.3 | 1.1 | 1.2 | 1.4 | 1.1 | 1.2 | 1.05 | 1.2 |
| Pressure in Reactor B (atm) | 1.3 | 1.1 | 1.2 | 1.4 | 1.1 | 1.2 | 1.05 | 1.2 |
| Feed and Product Lines Switch Over Time (min) | 20 | 25 | 20 | 16 | 19 | 23 | 20 | 5 |
| Time for Which Feed B1 is Replaced by Feed B2 before Switching the Feed and Product Lines (seconds) | 1.0 | 3.0 | 1.5 | 1.0 | 2.5 | 2.0 | 2.0 | 3.0 |
| Conversion of Methane (%) | 30.2 | 59.7 | 46.9 | 41.1 | 63.4 | 51.2 | 4.5 | 81.3 |
| CO-Free H$_2$ Produced (mmol/(g·h)) | 216 | 129 | 214 | 331 | 201 | 207 | 18 | 121 |

TABLE 2

CO-FREE HYDROGEN PRODUCTION BY THE
PROCESS OF THE INVENTION USING DIFFERENT
CATALYSTS COMPRISING NICKEL AND/OR COBALT

| Example No. | Example 9 | Example 10 | Example 11 |
|---|---|---|---|
| Catalyst Pretreatment Conditions Employed in Step (i) | | | |
| Catalyst | Ni/Si-MCM-41 | Ni/CeNaY | NiCo/MgO/SA5205 |
| Pretreatment Gas | 5% H$_2$ in N$_2$ | 15% H$_2$ in N$_2$ | Pure H$_2$ |
| GHSV of Pretreatment Gas (cm$^3$/(g·h)) | 4230 | 2520 | 1060 |
| Temperature of Pretreatment (° C.) | 620 | 610 | 802 |
| Period of the Pretreatment (hours) | 2 | 3 | 1 |
| Process Conditions in Step (ii) | | | |
| Feed A | Pure Methane | Natural Gas[a] | Natural Gas[a] |
| Feed B1 | Steam | Steam | Steam |
| Feed B2 | Pure H$_2$ | Pure H$_2$ | Pure H$_2$ |
| GHSV of Feed A (cm$^3$/(g·h)) | 3340 | 23450 | 3130 |
| GHSV of Feed B1 (cm$^3$/(g·h)) | 3310 | 23220 | 3115 |
| GHSV of Feed B2 (cm$^3$/(g·h)) | 3330 | 22900 | 3020 |
| Temperature of Reactor A (° C.) | 670 ± 4 | 650 ± 4 | 803 ± 5 |
| Temperature of Reactor B (° C.) | 670 ± 4 | 650 ± 4 | 803 ± 5 |
| Pressure in Reactor A (atm) | 1.3 | 1.6 | 1.4 |
| Pressure in Reactor B (atm) | 1.3 | 1.6 | 1.4 |
| Feed and Product Lines Switch Over Time (min) | 10.5 | 5.5 | 27 |
| Time for Which Feed B1 is Replaced by Feed B2 before Switching the Feed and Product Lines (seconds) | 2.0 | 0.5 | 1.5 |
| Conversion of Methane (%) | 49.2 | 27.3 | 67.8 |
| CO-Free H$_2$ Produced (mmol/(g·h)) | 146 | 571 | 186 |

[a]Natural gas containing 94.7 mole percent methane, 2.5 mole percent ethane, 1.0 mole percent C$_3$-C$_4$ hydrocarbon, 0.2 mole percent CO$_2$ and the balance nitrogen.

Some Advantages of the Present Process:

Unlike previous steam reforming and auto thermal reforming processes, carbon monoxide-free hydrogen can be directly produced by the process of this invention.

Unlike previous steam reforming and auto thermal reforming processes, the conversion of methane and steam take place separately in two different reactors, two parallel reactors, each having a different feed, and the two different feeds: one comprising methane, and second comprising steam (with or without oxygen), are switched regularly between the two reactors at an interval of time so that when methane decomposition reaction occurs in one reactor producing hydrogen and carbon deposited on the catalyst, at the same time the gasification of the carbon by its reaction with steam and/or oxygen, producing carbon monoxide, carbon dioxide and hydrogen, takes place in the second reactor, and these two reactions in two separate reactors occur in place in a cyclic manner and the products of these two reactions are collected separately, so that there is no build-up of carbon on the catalyst in both the parallel reactors, and CO-free $H_2$ is produced from the hydrocarbon decomposition reaction.

Unlike previous processes based on low temperature methane decomposition, the production of carbon monoxide-free hydrogen in the process of this invention is continuous without build-up of carbon on the catalyst, and consequently, without the build-up of a large pressure drop across the catalyst bed, and also without the catalyst deactivation by carbon deposition or coking.

In the process of this invention, the hydrocarbon decomposition and carbon gasification reactions are carried out at a higher temperature than that employed in the previous processes based on the methane decomposition, the thermodynamic barrier on both the reactions in the present case is much lower and also the conversions of methane is much higher.

The invention claimed is:

1. A process for the continuous production of carbon monoxide-free hydrogen from methane or methane-rich hydrocarbons, using a solid catalyst comprising at least one group VIII metal in two parallel catalytic reactors, said process comprising the steps of:
   (i) packing the solid catalyst in the two different catalytic reactors kept parallel;
   (ii) pre-treating the catalyst of step (i) kept in both the reactors with a reducing agent of pure $H_2$ or $H_2$—$N_2$ mixture containing at least about 5 mole percent $H_2$, at a temperature in the range of about 600° C. to about 800° C., and at a pressure of at least about 1 atmosphere for a period of at least about 0.5 hour;
   (iii) contacting the pretreated catalyst of step (ii) with a first gaseous feed comprising methane or natural gas, called Feed A, with the solid catalyst of the first reactor, called Reactor A, at a temperature in the range of about 600° C. to about 1000° C. and at a pressure of at least about 1 atmosphere;
   (iv) contacting simultaneously a second gaseous feed comprising steam, with or without oxygen, called Feed B1, with the solid catalyst in the second reactor, called Reactor B, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from Feed B1, called Product Gas B, using product switch over valve situated between the two parallel reactors, Reactor A and Reactor B, at an interval time in the range of about 0.1 minutes to about 100 minutes, such that, before the simultaneous switching of the two switch over valves for the next cyclic operation, Feed B1 is replaced by pure $H_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free $H_2$ and unconverted methane, obtained from Feed A, and the second consisting of CO, $CO_2$ $CH_4$ and $H_2$, with or without $O_2$, obtained from Feeds B1 and B2 after the removal of water by condensation; and
   (v) separating the carbon monoxide-free hydrogen from Product Gas A and the hydrogen, methane and carbon monoxide from Product Gas B.

2. The process of claim 1, wherein in step (ii), the reducing agent gas is provided at a gas hourly space velocity in the range of about 500 $cm^3/(g·h)$ to about 20,000 $cm^3/(g·h)$.

3. The process of claim 1, wherein in step (iii), the first gaseous feed is provided at a gas hourly space velocity in the range of about 250 $cm^3/(g·h)$ to about 50,000 $cm^3/(g·h)$.

4. The process of claim 1, wherein in step (iv), the second gaseous feed is provided at a gas hourly space velocity in the range of about 250 $cm^3/(g·h)$ to about 50,000 $cm^3/(g·h)$.

5. A process for the continuous production of carbon monoxide-free hydrogen from methane or methane-rich hydrocarbons, using a solid catalyst comprising at least one group VIII metal in two parallel catalytic reactors, said process comprising the steps of:
   (i) packing the solid catalyst in the two different catalytic reactors kept parallel;
   (ii) pre-treating the catalyst of step (i) kept in both the reactors with a reducing agent of pure $H_2$ or $H_2$—$N_2$ mixture containing at least about 5 mole percent $H_2$, at a gas hourly space velocity in the range of about 500 $cm^3/(g·h)$ to about 20,000 $cm^3/(g·h)$ at a temperature in the range of about 600° C. to about 800° C., and at a pressure of at least about 1 atmosphere for a period of at least about 0.5 hour;
   (iii) contacting the pretreated catalyst of step (ii) with a first gaseous feed comprising methane or natural gas, called Feed A, at a gas hourly space velocity in the range of about 250 $cm^3/(g·h)$ to about 50,000 $cm^3/(g·h)$, with the solid catalyst of the first reactor, called Reactor A, at a temperature in the range of about 600° C. to about 1000° C., and at a pressure of at least about 1 atmosphere;
   (iv) contacting simultaneously a second gaseous feed comprising steam, with or without oxygen, called Feed B1, at a gas hourly space velocity in the range of about 250 $cm^3/(g·h)$ to about 50,000 $cm^3/(g·h)$, with the solid catalyst in the second reactor, called Reactor B, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from Feed B1, called Product Gas B, using product switch over valve situated between the two parallel reactors, Reactor A and Reactor B, at an interval time, in the range of about 0.1 minutes to about 100 minutes, such that before the simultaneous switching of the two switch over valves for the next cyclic operation, Feed B1 is replaced by pure $H_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free $H_2$ and unconverted methane, obtained from Feed A, and second consisting of CO, $CO_2$, $CH_4$ and $H_2$, with or without $O_2$, obtained from Feeds B1 and B2 after the removal of water by condensation; and
   (v) separating the carbon monoxide-free hydrogen from Product Gas A and the hydrogen, methane and carbon monoxide from Product Gas B.

6. The process as claimed in claim 5, wherein in step (iii), the gas hourly space velocity of Feed A used is preferably in the range of about 500 $cm^3/(g·h)$ to about 25,000 $cm^3/(g·h)$.

7. The process as claimed in claim 5, wherein the temperature maintained in the two reactors, Reactor A and Reactor B, is in the range of about 600° C. to about 800° C.

8. The process as claimed in claim 5, wherein in step (iv), the gas hourly space velocity of Feed B1 is in the range of about 500 cm$^3$/(g·h) to 25,000 cm$^3$/(g·h).

9. The process as claimed in claim 5, wherein in step (iv), the oxygen to steam ratio in Feed B1 is in the range of from 0:1 to 0.5:1.0.

10. The process as claimed in claim 5, wherein in step (iv), the interval time for the feed stream and product stream switch over ranges preferably from about 1 minute to about 30 minutes.

11. The process as claimed in claim 5, wherein in step (iii), the concentration of methane used in Feed A is at least about 80%.

12. The process as claimed in claim 5, wherein in step (iv), the concentration of steam used in Feed B1 is in the range of about 50 mole percent to 100 mole percent.

13. The process as claimed in claim 5, wherein in step (iv), the concentration oxygen in the Feed B1 ranges from about 0 mole percent to about 50 mole percent.

14. The process as claimed in claim 5, wherein the two parallel reactors used are fixed-bed reactors or packed bed reactors.

15. The process as claimed in claim 5, wherein the solid catalyst used in step (i), is a group VIII metal comprising one or more of Fe, Co, Ni, Ru, Rh, Pd, Pt, Ir, Os or mixtures thereof.

16. The process as claimed in claim 5, wherein the group VIII metal in the solid catalyst comprises one or more of nickel, cobalt or mixtures thereof.

17. The process as claimed in claim 5, wherein in step (iv), the concentration of steam in the Feed B1 ranges from about 50 mole percent to about 500 mole percent.

18. The process as claimed in claim 5, wherein the concentration of steam in the feed B1 ranges from about 50 mole percent to about 100 mole percent.

19. Carbon monoxide-free hydrogen produced from methane or methane-rich hydrocarbons by a process which uses a solid catalyst comprising at least one group VIII metal in two parallel catalytic reactors, the process comprising the steps of:
(i) packing the solid catalyst in the two different catalytic reactors kept parallel;
(ii) pre-treating the catalyst of step (i) kept in both the reactors with a reducing agent of pure $H_2$ or $H_2$—$N_2$ mixture containing at least about 5 mole percent $H_2$, at a temperature in the range of about 600° C. to about 800° C., and at a pressure of at least about 1 atmosphere for a period of at least about 0.5 hour;
(iii) contacting the pretreated catalyst of step (ii) with a first gaseous feed comprising methane or natural gas, called Feed A, with the solid catalyst of the first reactor, called Reactor A, at a temperature in the range of about 600° C. to about 1000° C., and at a pressure of at least about 1 atmosphere;
(iv) contacting simultaneously a second gaseous feed comprising steam, with or without oxygen, called Feed B1, with the solid catalyst in the second reactor, called Reactor B, at a temperature in the range of about 600° C. to about 1000° C., at a pressure of at least about 1 atmosphere, while simultaneously switching over to the two feeds, Feed A and Feed B1, using a feed stream switch over valve, the two product lines for the gaseous products obtained from Feed A, called Product Gas A, and the gaseous products obtained from Feed B1, called Product Gas B, using product switch over valve situated between the two parallel reactors, Reactor A and Reactor B, at an interval time in the range of about 0.1 minutes to about 100 minutes, such that, before the simultaneous switching of the two switch over valves for the next cyclic operation, Feed B1 is replaced by pure $H_2$ or by the product gases obtained from Feed A, called Feed B2, to flush the reactor through which Feed B1 was passed so that all the products obtained from Feed B1 are removed from the reactor before Feed A enters the reactor, and collecting separately the two different gaseous products, one consisting of carbon monoxide-free $H_2$ and unconverted methane, obtained from Feed A, and second consisting of CO, $CO_2$, $CH_4$ and $H_2$, with or without $O_2$, obtained from Feeds B1 and B2 after the removal of water by condensation; and
(v) separating the carbon monoxide-free hydrogen from Product Gas A and the hydrogen, methane and carbon monoxide from Product Gas B.

20. Carbon monoxide-free hydrogen produced in accordance with claim 19, wherein the solid catalyst used in step (i), is a group VIII metal comprising one or more of Fe, Co, Ni, Ru, Rh, Pd, Pt, Ir, Os or mixtures thereof.

* * * * *